United States Patent [19]

Lunetta

[11] 4,114,997
[45] Sep. 19, 1978

[54] NAVIGATIONAL DEVICE

[76] Inventor: Donald M. Lunetta, 64 Pinecliff Rd., Chappaqua, N.Y. 10514

[21] Appl. No.: 658,683

[22] Filed: Feb. 17, 1976

[51] Int. Cl.² ..................... G03B 21/22; G03B 21/28
[52] U.S. Cl. .......................................... 353/11; 353/42; 353/77; 353/98
[58] Field of Search ..................... 353/11, 12, 13, 14, 353/42, 30, 37, 80, 77, 98

[56] References Cited

U.S. PATENT DOCUMENTS

| | | | |
|---|---|---|---|
| 3,094,781 | 6/1963 | Vangor | 33/1 |
| 3,269,258 | 8/1966 | Byrd et al. | 353/45 |
| 3,826,579 | 7/1974 | Schurgin | 353/12 |
| 3,832,050 | 8/1974 | Johannsen | 353/42 |
| 3,865,477 | 2/1975 | Gast | 353/11 |

Primary Examiner—Steven L. Stephan
Attorney, Agent, or Firm—Pennie & Edmonds

[57] ABSTRACT

A film projection device having a screen, light source, lens and mirror system and a reference indicator disposed immediately in front of the mirror for shadow casting a reference line onto the image of a film projected onto the screen via initial projection onto the mirror.

7 Claims, 6 Drawing Figures

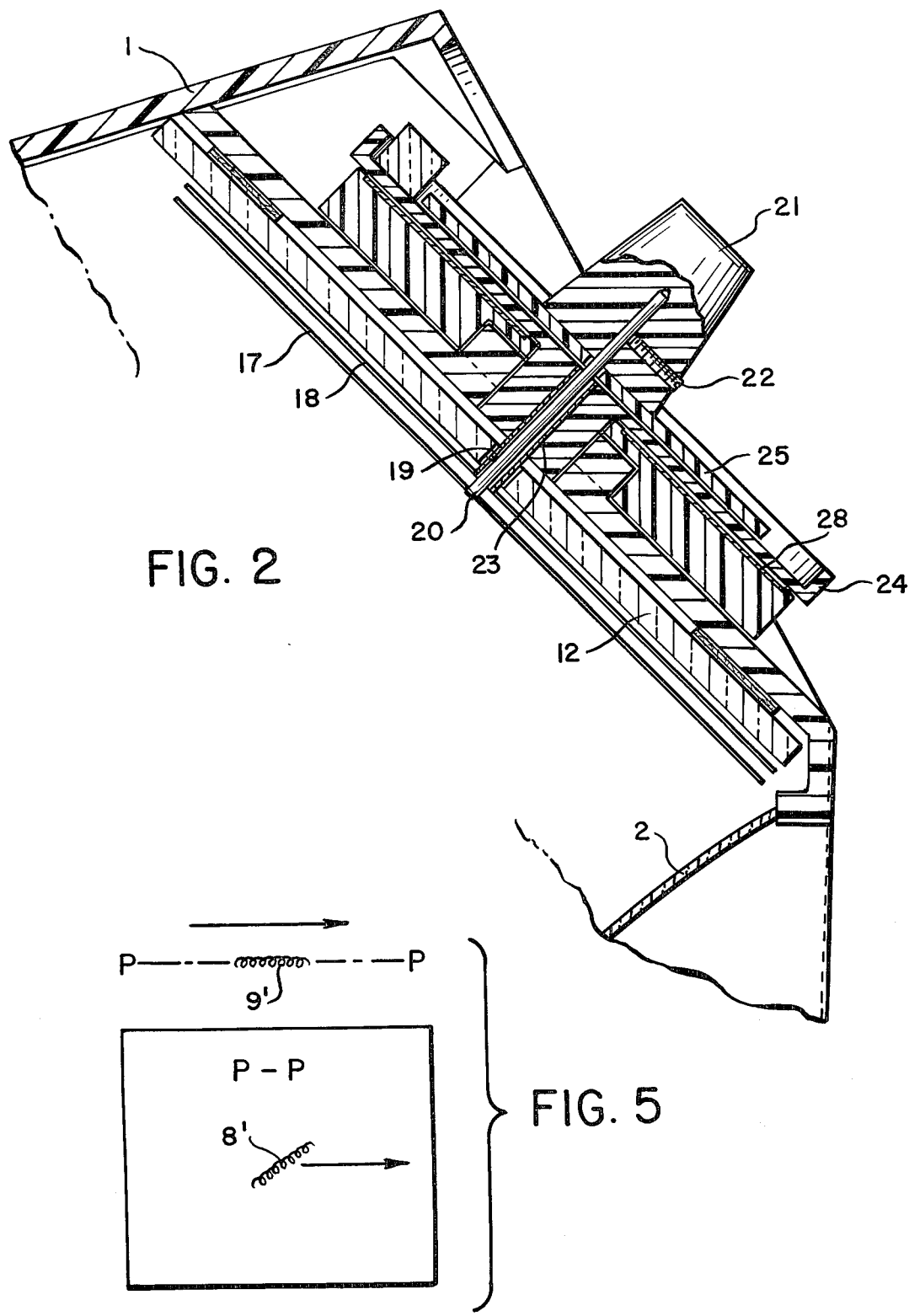

NAVIGATIONAL DEVICE

BACKGROUND OF THE INVENTION

In boat and airplane navigation where electronic navigational devices are not employed, it is most usual to use nautical charts. These charts are typically large and require use of various mechanical instruments for plotting a course or locating one's position on the chart. Usually, protractors, compasses, parallel rules, straight edges and grease pencils are needed. The manner in which these instruments are used is well known and need not be explained here. For purposes of understanding the present invention, it is sufficient to point out that this system of navigating is generally cumbersome and unwieldly, particularly, for example, on small boats and in foul weather when the equipment is used outside. Not only are the charts large in size, plotting positions and courses on the charts with the various mechanical instruments is inconvenient. Misplacement or loss of the instruments is also a problem not to mention the rather extensive collection of the large chargs that must be maintained.

SUMMARY OF THE PRESENT INVENTION

In accordance with the teachings of the present invention, a navigational film projection device is provided in which compact microfiche film cards are used in place of the typical large nautical charts. The device also includes all necessary means to perform the function of the conventional mechanical instruments for quickly ascertaining one's location or plotting ones's course. In construction, the device employs a conventional microfilm reader for viewing microfiche film cards. A lens magnifying system is included whereby the image of each microfiche film card is projected through lenses and onto a mirror from where it is reflected in enlarged size onto a viewing screen.

The basic construction of the reader is convered to a navigational projection device by incorporating course line indicators so located as to project a sharp image of the course lines onto the film image shown on the screen. The course line indicators include a pair of intersecting primary course line indictors disposed immediately in front of the mirror for shadow casting course lines directly onto the screen and a pair of intersecting secondary course line indicators fixed for movement with but disposed remotely of the first pair of indicators. The secondary course line indictors are associated with a compass showing magnetic north. Reading the compass in conjunction with the course line indicators permits the user to transpose actual bearing and course conditions directly onto the viewing screen.

In using the device to navigate a boat, for example, a microfiche film card showing the general area being navigated is first brought into view on the screen. The secondary course line indicators are then set relative to the compass to show the bearing of a pair of visual landmarks from the present location of the boat, the boat being represented by the point of intersection of the lines with each other. This automatically sets the primary course line indicators to the proper compass bearing on the projected image of the same area shown on the screen. The set course lines and projected image are next translated to each other until the bearing course lines intersect the landmarks previously cited visually. The point of intersection of the course lines with each other will then show the location of the boat on the screen.

For plotting one's course from a known location, it is simply a matter of setting one of the primary course line indicators to project a line on the screen which passes through both the present location of the boat and the desired destination. The compass bearing reading will then be shown on the compass by the corresponding secondary course line indicator.

The compass used in the device shows magnetic north so that the course line indicators can be set to give magnetic bearing and course readings. The compass may be either a conventional magnetic compass or a compass rose. Where a magnetic compass is used, magnetic bearing and course readings will be transposed directly onto the image of the area on the screen. Where, on the other hand, a compass rose is used, means are included for setting it to the same magnetic north as that of the area shown on the microfiche film and projected onto the screen.

In addition to course and bearing readings, the device can be used to calculate either one's speed, the distance between two points or the time required for travelling between two points. Conventional nautical charts are provided with a logarithemic scale whereby any one of these factors (speed, distance or time) may be calculated if the other two are known. The scale is designed for use with a pair of dividers. With the present device, the microfiche film cards are provided with the needed logarithemic scale and the primary course line indicators are used as a pair of dividers.

As a further feature of the present invention, the light source of the device is constructed so as to essentially provide a point light source. This light source in conjunction with the placement of the primary course line indicators directly in front of the mirror, will project clear and sharp images of these course lines onto the screen.

Although the projection device of the present invention is particularly suited for use as a navigational device, it also has utility in other areas. For example, it can be used simply for projecting a reference line onto the image of a film as projected onto the screen of the device. The projected image may show any kind of written or pictoral information and the reference line can be either a point, circle, curve or other type of line particularly chosen for use with the information on the film.

BRIEF DESCRIPTION OF THE DRAWINGS

FIG. 2 is an enlarged cross-sectional view of the film projection device of FIG. 1 showing the construction and placement of the course line indicators;

FIG. 5 is a schematic view showing a variation of the orientation of the light source that may be used in the device shown in FIGS. 1–4.

DETAILED DESCRIPTION OF THE PREFERRED EMBODIMENT

Figure 1:
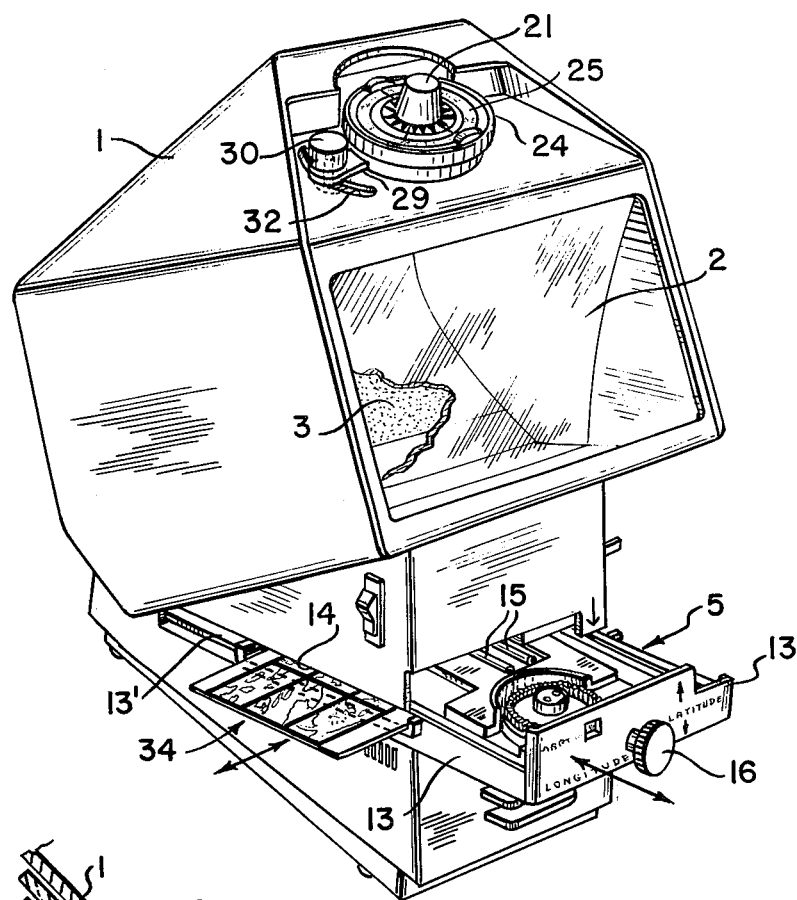
FIG. 1 is a front perspective view of the film projecting device of the present invention.
Figure 4:
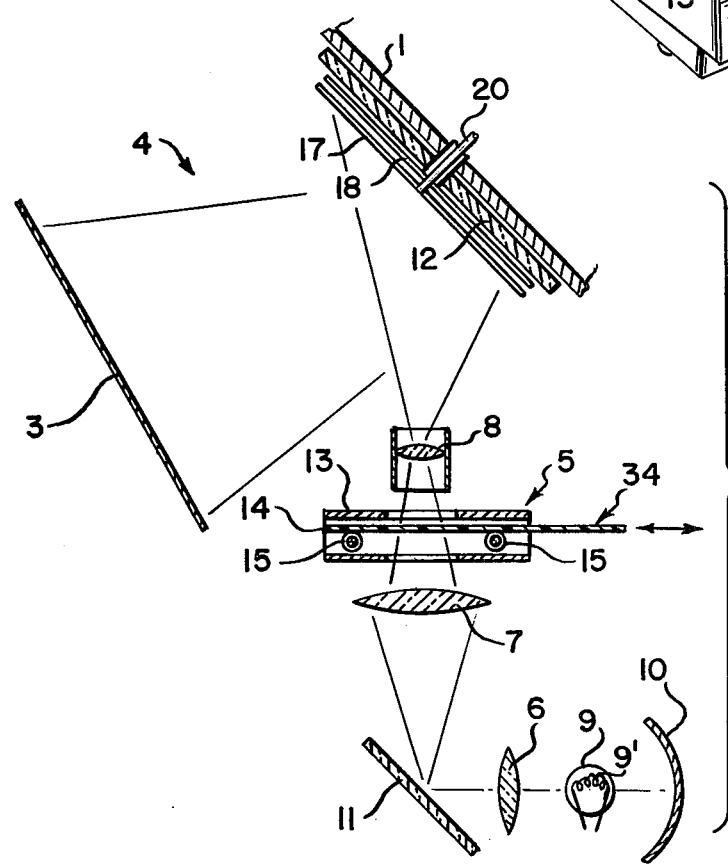
FIG. 4 is a schematic view showing the preferred light and lens system of the present invention.

As shown in FIGS. 1 and 4, the film projection device includes a housing 1 having a front window 2, an internally disposed viewing screen 3 located behind the window, a lens and mirror system generally designated at 4, and a film holder 5 for holding a microfiche card so that an image of the film can be projected onto the screen 3. The projection device is designed for use with microfiche film cards and the lens system includes a plurality of lenses 6, 7, 8 for magnifying images of these cards onto the screen.

More particularly, the lenses 6, 7, 8 operate in conjunction with a light source 9, 10 and a mirror 11 to project an image of the film onto a second mirror 12 and to reflect this image onto the screen 3. The first two lenses 6 and 7 in the system are condenser lenses of conventional construction while the third lens 8 is a projection lens. The mirror 11 is used for directing the light from the light source in the proper direction. The light source itself includes an incandescent filament lamp 9 and a reflector 10. The mirror 12 against which the image of the film is projected is mounted adjacent the wall structure of the device at the front of the housing. As seen from FIG. 2, it is disposed above the front window and out of view of one looking through the window and at the screen 3.

For carrying the microfiche film cards, the film holder 5 is constructed to produce movement of each microfiche film card in two perpendicular directions. More particularly, the film holder includes a carriage 13 which is slidable along tracks 13' in a direction toward and away from the screen 3. The microfiche film card is adapted to be inserted into this carriage from the side. A slot 14 is provided for this purpose. Underlying the slot are a pair of rollers 15 having their axes extending in the direction of sliding movement of the carrier 13. Rotation of the rollers 15 is controlled by a knob 16 extending through the front of the carriage 13. Rotation of the knob causes rotation of the rollers and this in turn translates the microfiche film card laterally through the carrier 13 in a direction perpendicular to the sliding movement of the carrier. As shown in FIG. 4, the film holding device 5 is disposed between the second condensing lens 7 and the projection lens 8 of the system. The microfiche film card can thus be adjusted relative to the lens system to project any portion of it onto the screen 3.

The construction of the projection device as so far described is entirely conventional. It may, for example, be a microfilm reader as manufactured and sold by Eastman Kodak Company of Rochester, New York under the name KODAK EKTALITE 120 READER.

Applicant's invention resides in the conversion of a conventional microfilm reader into a projection device having line indicator means so located in the device as to shadow cast an indicator line or lines onto the image shown on the viewing screen. In the particular embodiment disclosed herein, the projection device is one particularly suited for use as a navigational aid.

Figure 3:
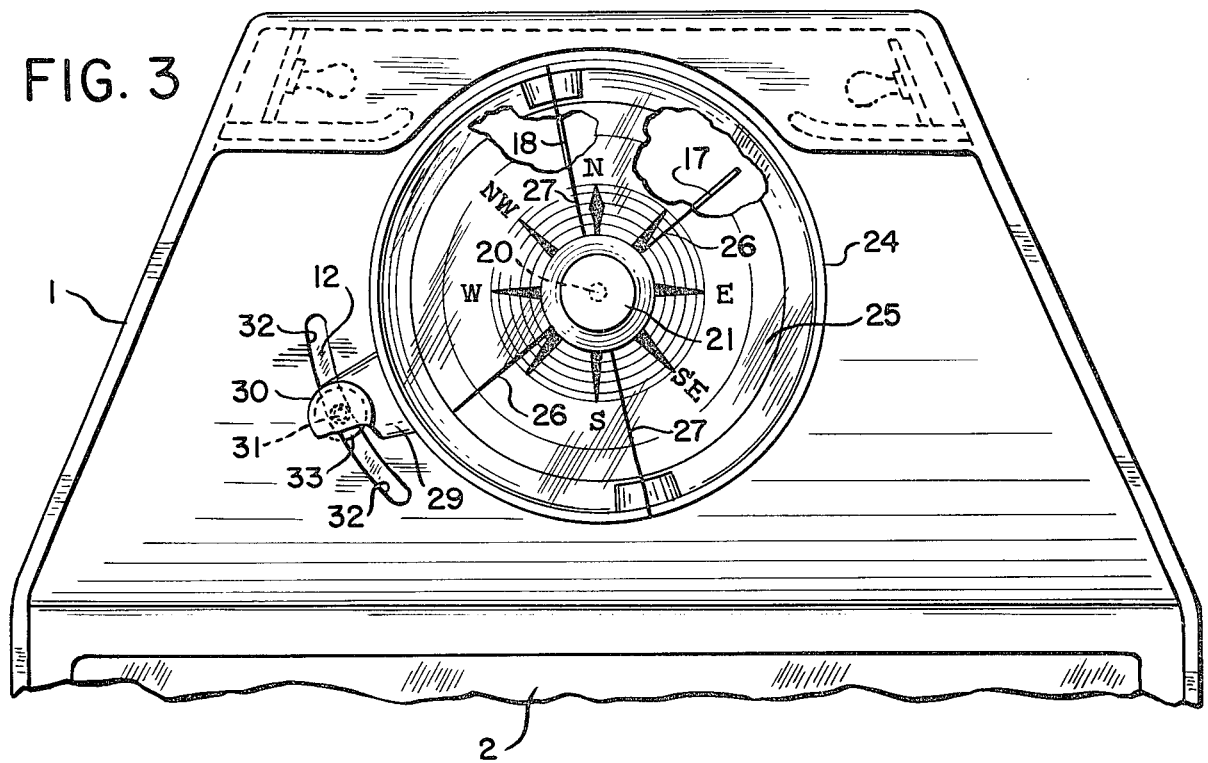
FIG. 3 is a front view of the device of FIG. 1 showing the course line indicators and compass.

As explained above, navigation with the use of conventional charts requires mechanical instruments for orienting straight lines on the chart of the area being navigated. Depending on how these lines are oriented, they can either be used for determining one's present location or for showing a desired bearing course. In accordance with the teachings of the present invention, this result is achieved by mounting a pair of primary course line indicators 17, 18 immediately in front of the mirror 12. As shown in FIGS. 2 and 3, these primary course line indicators are mounted for rotation, independently of each other, about a common axis. In construction, the mirror 12 is provided with a central hole 19 through which the mounting structure for the indicators 17 and 18 extends. As shown in FIG. 2, the indicator 17 is fixed to a shaft 20. The shaft 20 extends through the hole 19 and is connected at its other end to a control knob 21. A set screw 22 is used to fix the shaft 20 against rotation relative to the control knob 21. The other primary course line indicator 18 is fixed to a shaft 23 disposed in surrounding but spaced relationship to the shaft 20. At the other end of the shaft 23, a control disc 24 is attached. The shaft 23 may be press fit into the disc 24 to assure rotation of the two members as a single unit.

With the above construction and mounting of the line indicators 17, 18, the control knob 21 and control disc 24 can be rotated to effect independent rotation of the indictors and since they are disposed immediately in front of the mirror 12, onto which the image from the microfiche film card is projected, these lines together with the image will be reflected onto the screen 3. The line indicators are closely spaced from the mirror to prevent the creation of double images. Also, the light source used for projecting the shadow of these lines onto the screen is a point light source. With a point light source, the tendency toward double imaging of the line indicators is further reduced.

In the projection device of the present invention, the normal incandescent lamp 9 used for the conventional reader can be oriented in such a way as to produce the desired point light source. In the conventional reader, the mounting of the lamp 9 is adjustable so as to accommodate for different bulbs and assure a complete lighting of the whole screen. The conventional incandescent lamp includes an elongated filament 9' which extends across the top of the bulb. This filament lies generally along a straight axis; and by orienting the lamp so that the axis of the filament is disposed parallel to the path of light travelling into the lens system, an effective point light source is achieved. Orienting the filament lamp in this way and disposing the line indictors 17 and 18 close to the mirror 12 produces a clear image of these linkes on the screen.

Although with the line indicators being used as course lines, it is most desirable that they appear as single lines throughout their extent of rotation across the screen; in some situations, it may be desirable that the line indicator form a single line when oriented in one direction and a double line when oriented at right angles to the one direction. This can be achieved by orienting the filament lamp so that the filament 9'is disposed in a plane extending parallel to the path of light travelling into the first lens 6; but tilting the lamp so that the filament is tilted within this plane. In this way, a point light source is created as measured in a direction perpendicular to the plane but such a point light source is not created when measured along the direction of the plane.

A schematic representation of the orientation of the filament for creating the above-described condition is shown in FIG. 5. There, the direction of light entering the lens system is shown by the arrow and the plane in which the filament is disposed is represented by the letters P—P. The plane as shown at the top of FIG. 5 may, for example, extend vertically through the filament 9'. The bottom portion of FIG. 5 represents a side view of the plane P—P. Here, the filament is shown tilted upwardly in the plane.

As noted above, the construction of the light source and positioning of the primary course line indicators 17 and 18 are such as to produce a single sharp image of each of these indicators on the screen 3. In order to further facilitate use of these lines as a navigation tool, each primary indicator is connected in fixed relation to a secondary course line indicator disposed remotely of the front of the mirror. As shown in FIGS. 2 and 3, the control knob 21 for the primary course line indicator 17 is secured to a transparent disc 25. This disc 25 has a secondary course line indicator line 26 scribed thereon. The course line indicator 26 is aligned in parallel relation to the course line indicator 17 and directly overlies the line 17 as clearly shown in FIG. 3. With this construction, rotation of the control knob 21 will effect rotation of both the primary course line indicator 17 and the secondary course line indicator 26. Since the secondary course line indicator is disposed behind the mirror 12, it will not be shown on the screen but will be readily viewable by the user of the device.

The primary course line indicator 18 is similarly fixed to a secondary course line indicator for rotation therewith. This secondary course line indicator is scribed on the control disc 24 and shown in FIG. 3 at 27. Rotation of the control disc 24 is effected by engaging the periphery of the disc; and as will be evident from FIG. 2, such rotation is independent of the rotation of the control knob 21.

Both discs 24 and 25 are transparent and disposed immediately over a compass rose 28. As seen from FIG. 3, the compass rose shows magnetic north and can be used with the course line indicators 26 and 27 to point out different magnetic bearings on the compass. The compass rose and all course line indicators are mounted for rotation about a common axis. As shown in FIGS. 2 and 3, this axis extends through the center of the compass rose and coincides with the axis of the support shafts 20 and 23.

The compass rose is mounted for rotation independently of the discs 24 and 25 and provided with a control arm 29 for setting it in adjusted rotational position. The control arm includes a knob 30 and a shaft 31 extending through an arcuate slot 32 in the housing of the device. The shaft 31 is threaded into the knob 30 and at its other end includes an enlargement 33. Rotation of the knob will bring the enlargement 33 into clamping engagement with the undersurfce of the housing. Once the compass is rotated to the proper position, as described below, the knob 30 will be tightened to set it in this position.

Figure 6:
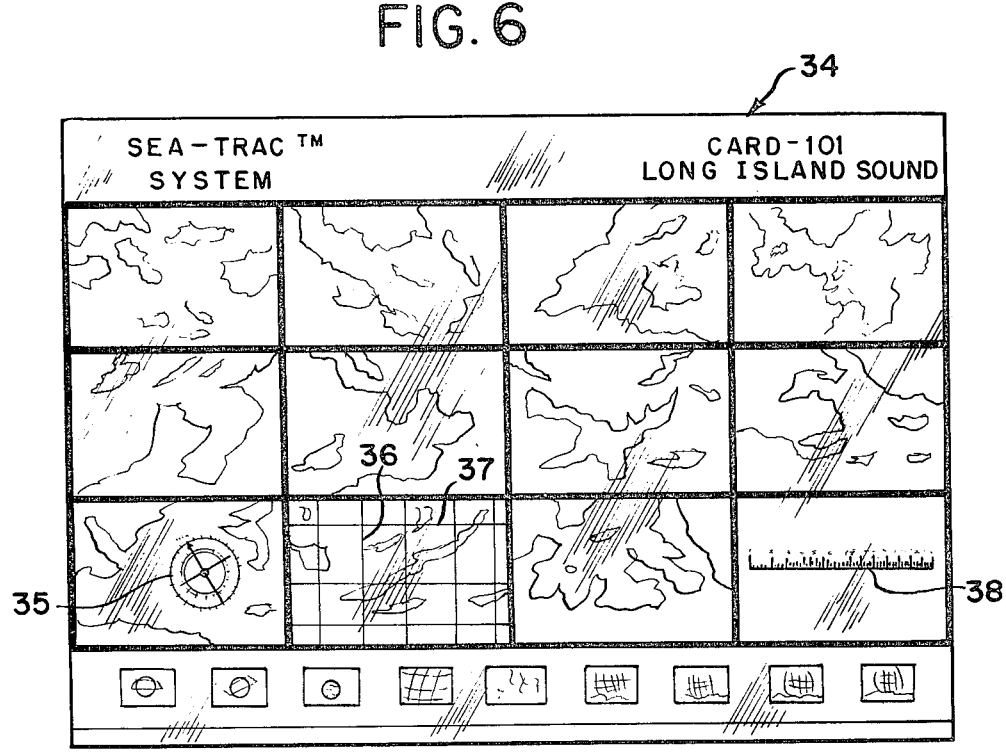
FIG. 6 is a view of a typical microfiche film card used with the device shown in FIGS. 1–4.

For using the projection device to navigate one's course, a plurality of microfiche film cards such as shown at 34 in FIG. 6 are supplied. Each one of these cards may, for example, contain 12 frames each of which corresponds to one of the usual large navigational charts normally employed in navigating. Each frame may show different sections of the area being navigated and some may show the same sections on different scales. As is conventional with the usual navigational charts, a compass rose 35 showing magnetic and true north is placed on each chart. The compass rose shows the deviation between magnetic north and true north; true north being oriented parallel to the side edges of the frames of the charts. In FIG. 6 a single compass rose is shown on one of the frames of the microfiche film card 34. Where all the frames of a single microfiche film card are of the same general area, it will be sufficient to have a single compass magnetic rose.

Each chart may also show meridians of longitudinal 36 and parallels of latitude 37. The areas shown on the frames are thus oriented so that true north and the meridians of longitude extend in the direction of sliding movement of the carriage 13 while the parallels of latitude, extending in the east-west direction, are parallel to the path of lateral movement of the microfiche film card through the slot 14 of the carriage.

In operating the navigational projection device, the appropriate microfiche film card showing the area being navigated is inserted into the slot 14 of the carriage 13 and translated to bring the compass rose into view on the screen 3. Since the magnetic north will deviate somewhat from the true north, it is necessary to correlate the compass rose of the microfiche film card with respect to the compass rose 28 on the top of the projection device. This is down by placing the axis of rotation of the primary course line indicators 17 and 18 directly over the center of the compass rose 35. Either one of the course line indicators is then rotated into alignment with magnetic north. The corresponding secondary line indicator associated with the compass rose 28 will then also show magnetic north. The compass nose is next adjusted by means of the control arm 29 and set to show the proper magnetic north. With the compass rose located in this position, the device is ready to be used to calculate magnetic bearings and courses.

If one's present position is not specifically known, it can be determined quickly and accurately with the projection device of the present invention by setting the secondary course line indicators to intersect two visual landmarks. For example, in navigating a boat, the navigator may sight two landmarks which he is familiar with. He can use his boat compass and take visual sightings of these landmarks to obtain their magnetic bearings. Knowing these magnetic bearings, the secondary course line indicators are set reltive to the compass rose. This in turn sets the primary course line indicators 17 and 18 to the same bearings. The landmarks on the appropriate frame of the microfiche film card are then located and the card translated relative to the projected course line on the screen 3 until each one of the two landmarks is intersected by one of the course lines. When this is done, the point of intersection of the course lines, that is, the point of their axes of rotation, will represent the location of the boat.

If one knows one's present location and desires to determine a bearing course to a particular area shown on the microfiche film card, the area is brought into view on the screen with the center of intersection of the course line 17 and 18 disposed in alignment with the present position of the boat. Either one of the course lines is then rotated until it intersects the landmark toward which the bearing is to be obtained. The corresponding secondary course line indicator is then read in conjunction with the compass rose to give the magnetic bearing to the landmark.

Although the present preferred construction of the navigational projection device includes a compass rose 28, it is possible to use a conventional magnetic compass. Where this is used, magnetic north will always be properly shown and no correlation of magnetic north on the microfiche film cards will have to be made.

In addition to using the course line indicators for plotting one's course or determining one's location, it is possible to use these lines as a pair of dividers to calculate one's speed, distance between two points or the time it will take to travel between the two points. As long as two of these factors is known, the other one can be determined. Conventional navigational charts include a logarithmic scale for this purpose. Such a scale is also included on each microfiche film card and shown at 38 in FIG. 6. The use of the scale on the conventional navigational chart requires a pair of dividers. With the present invention, the primary course line indicators 17 and 18 can function as a pair of dividers in conjunction with the scale 38 to determine one's speed, distance between two points or the time it will take to travel between the two points. To do this, indicators are set to the required spacing and then simply translated along the lagarithemic scale in the same manner as a pair of dividers.

I claim:

1. In a navigational film projection device having a screen, a light source, a lens and mirror system having at least one mirror, a film holder for holding a transparent film chart relative to said light source and lens and mirror system whereby an image of the chart is projected onto said mirror and from there onto said screen, a pair of primary course line indicators for showing course line on the image projected onto the screen and means for translating the chart and course lines relative to each other along two directions extending perpendicular to each other; the improvement comprising:
   (a) means for mounting the course line indicators immediately in front of said mirror for rotation independently of each other;
   (b) control means disposed remotely of the front of the mirror and connected to said course line indicators for controlling independent rotation thereof;
   (c) a pair of secondary course line indicators also disposed remotely of the front of the mirror and connected to said control means for rotation therewith in full view of the user of the device, each of said secondary course line indicators being aligned in parallel relation with one of the primary course line indicators and fixed for rotation therewith; and
   (d) a compass showing magnetic north and disposed in operative relation with the secondary pair of course line indicators and in view of the user.

2. The improvement in the navigational film projection device as set out in claim 1 wherein:
   (a) said light source includes a filament lamp having an elongated filament oriented in a direction extending parallel to the path of light traveling from the light source and into the lens system.

3. The improvement in the navigational film projection devices as set out in claim 1 wherein:
   (a) said light source is a point light source.

4. The improvement in the navigational film projection device as set out in claim 1 wherein:
   (a) said compass is a rotatable compass rose showing magnetic north; and
   (b) means are provided for setting said compass rose to the same magnetic north as that of the area shown on the film chart.

5. The improvement in the navigational film projection device as set out in claim 4 wherein:
   (a) said means for translating the film chat and course lines relative to each other includes means for translating the film chart in said two directions.

6. The improvement in the navigational film projection device as set out in claim 5 wherein:
   (a) the means for translating the film in said two directions includes guide structure limiting the translating along perpendicular directions corresponding to the latitude and longitude orientation of the area shown on the film chart.

7. The improvement in the navigational film projection device as set out in claim 5 wherein:
   (a) a housing is provide for containing said screen, said light source and said lens and mirror system internally thereof;
   (b) said housing includes a window in the wall structure at the front thereof through which said screen can be viewed;
   (c) said mirror is mounted adjacent the wall structure at the front of the housing;
   (d) the means for mounting the primary course line indicators extends through said mirror and the adjacent wall structure at the front of the housing with one end connected to said primary course line indicators and the other end to the control means for said indicators;
   (e) the compass rose is mounted behind the mirror; and
   (f) the secondary course line indicators are connected to said control means at a location behind said mirror with the axis of rotation of all course line indicators extending through the center of the compass rose.

* * * * *

UNITED STATES PATENT AND TRADEMARK OFFICE
CERTIFICATE OF CORRECTION

PATENT NO. : 4,114,997
DATED : September 19, 1978
INVENTOR(S) : Donald M. Lunetta It is certified that error appears in the above-identified patent and that said Letters Patent are hereby corrected as shown below:

Col. 2, line 19, "microfiche film" should read --microfiche film card--.

Col. 3, line 3, "microfiche card" should read --microfiche film card--.

Col. 4, line 40, "linkes" should read --lines--.

Col. 5, line 45, "undersurfce" should read --undersurface--.

Col. 6, line 15, "is down" should read --is done--;
line 20, "secondary line" should read --secondary course line--;
line 22, "compass nose" should read --compass rose--;
line 35, "reltive" should read --relative--;
line 55, "to the" should read --to that--.

Col. 7,
line 21, "course line" should read --course lines--.

Col. 8, line 2, "devices" should read --device--.

Signed and Sealed this

Twenty-second Day of May 1979

[SEAL]

Attest:

RUTH C. MASON
Attesting Officer

DONALD W. BANNER
Commissioner of Patents and Trademark